US012762513B2

(12) United States Patent
Kumar et al.

(10) Patent No.: US 12,762,513 B2
(45) Date of Patent: Oct. 13, 2026

(54) TICKET TROUBLESHOOTING SUPPORT SYSTEM

(71) Applicant: Microsoft Technology Licensing, LLC, Redmond, WA (US)

(72) Inventors: Udayan Kumar, Kirkland, WA (US); Rakesh Jayadev Namineni, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 18/547,328

(22) PCT Filed: Feb. 21, 2022

(86) PCT No.: PCT/US2022/017163
§ 371 (c)(1),
(2) Date: Aug. 21, 2023

(87) PCT Pub. No.: WO2022/191982
PCT Pub. Date: Sep. 15, 2022

(65) Prior Publication Data

US 2024/0135323 A1 Apr. 25, 2024
US 2024/0232804 A9 Jul. 11, 2024

(30) Foreign Application Priority Data

Mar. 9, 2021 (LU) ........................................ 102633

(51) Int. Cl.
*G06Q 10/10* (2023.01)
*G06Q 10/20* (2023.01)

(52) U.S. Cl.
CPC ............. *G06Q 10/10* (2013.01); *G06Q 10/20* (2013.01)

(58) Field of Classification Search
CPC ........ G06Q 10/10; G06Q 10/20; G06Q 50/10; G06F 18/24143; G06N 3/045; G06N 3/08; G06N 20/00
See application file for complete search history.

(56) References Cited

U.S. PATENT DOCUMENTS 8,245,133 B2 8/2012 Grigoriadis et al.
10,459,951 B2 10/2019 Venkataraman et al.
(Continued)

FOREIGN PATENT DOCUMENTS

WO WO-2022191982 A1 9/2022

OTHER PUBLICATIONS

"International Application Serial No. PCT/US2022/017163, International Search Report mailed Jun. 1, 2022", 4 pgs.
(Continued)

*Primary Examiner* — Dylan C White
(74) *Attorney, Agent, or Firm* — Schwegman Lundberg & Woessner, P.A.

(57) ABSTRACT

Systems and methods for providing ticket support using a machine learning model trained using clusters of support tickets that are clustered based on similarity of resolution commands are provided. The system extracts commands used to resolve prior tickets and creates clusters of resolved tickets based on similarity of the commands. For each cluster, problem statements are extracted from the resolved tickets. The system trains a machine learning model with the extracted problem statements to identify a cluster number for each cluster. With a new support ticket, the system extracts a problem statement from the new ticket and identifies a predicted cluster number by applying the trained machine learning mode! to the problem statement from the new ticket. Based on the predicted cluster number, one or more commands used to resolve the prior tickets in the
(Continued)

cluster corresponding to the predicted cluster number are accessed and provided to a requesting user.

17 Claims, 6 Drawing Sheets

(56) References Cited

U.S. PATENT DOCUMENTS

| | | | | |
|---|---|---|---|---|
| 10,685,359 | B2 | 6/2020 | Walthers et al. | |
| 10,762,544 | B2 | 9/2020 | Grabarnik et al. | |
| 11,042,581 | B2 * | 6/2021 | Jan | G06F 18/214 |
| 12,229,517 | B2 * | 2/2025 | Das | G06N 20/00 |
| 2017/0353991 | A1 * | 12/2017 | Tapia | H04L 43/08 |
| 2018/0032971 | A1 * | 2/2018 | Karuppasamy | G06N 20/00 |
| 2018/0336485 | A1 * | 11/2018 | Bikumala | G06F 16/285 |
| 2019/0130415 | A1 * | 5/2019 | Cheah | G06Q 10/04 |
| 2019/0347599 | A1 * | 11/2019 | Fry | G06N 20/00 |
| 2020/0065151 | A1 * | 2/2020 | Ghosh | G06F 40/295 |
| 2020/0136928 | A1 * | 4/2020 | Sethi | H04L 41/16 |
| 2020/0204431 | A1 * | 6/2020 | Bahrami | G06N 20/20 |
| 2020/0293946 | A1 | 9/2020 | Sachan et al. | |
| 2021/0019648 | A1 * | 1/2021 | Backas | H04L 51/02 |
| 2021/0264253 | A1 * | 8/2021 | Damodaran | G06N 3/08 |
| 2021/0328888 | A1 * | 10/2021 | Rath | G06F 18/22 |
| 2022/0044254 | A1 * | 2/2022 | Dixit | G06Q 30/016 |
| 2022/0237626 | A1 * | 7/2022 | White, Jr. | G06N 20/00 |
| 2023/0412475 | A1 * | 12/2023 | Sobolev | H04L 41/065 |
| 2024/0232804 | A9 * | 7/2024 | Kumar | G06N 3/08 |
| 2024/0386214 | A1 * | 11/2024 | Ghoche | G06Q 30/015 |
| 2025/0139152 | A1 * | 5/2025 | Jiang | G06F 40/284 |

OTHER PUBLICATIONS

"International Application Serial No. PCT/US2022/017163, Written Opinion mailed Jun. 1, 2022", 8 pgs.

"Search Report and Written Opinion Issued in Luxembourg Patent Application No. LU102633", Mailed Date: Dec. 13, 2021, 10 Pages.

Zhou, et al., "Resolution Recommendation for Event Tickets in Service Management", In Journal of Transactions on Network and Service Management, vol. 13, Issue 4, Dec. 2016, pp. 954-967.

Zhou, et al., "STAR: A System for Ticket Analysis and Resolution", In Proceedings of 23rd ACM SIGKDD International Conference on Knowledge Discovery and Data Mining, Aug. 13, 2017, 10 Pages.

Communication under Rule 71(3) EPC, Received for European Application No. 22708011.6, mailed on Jun. 1, 2026, 7 pages.

* cited by examiner

TICKET TROUBLESHOOTING SUPPORT SYSTEM

CLAIM FOR PRIORITY

This application is a U.S. national stage filing under 35 U.S.C. § 371 from International Application No. PCT/US2022/017163, filed on Feb. 21, 2022, and published as WO 2022/191982 on Sep. 15, 2022, which claims the benefit of priority of Luxembourg Patent Application No. LU102633, filed Mar. 9, 2021, the benefit of priority of each of which is claimed herein, and which applications and publication are hereby incorporated by reference in their entirety.

TECHNICAL FIELD

The subject matter disclosed herein generally relates to configuring machines for troubleshooting tickets. Specifically, the present disclosure addresses systems and methods that provide support in resolving tickets using a machine learning model.

BACKGROUND

Conventionally, there are challenges with producing, updating, and using troubleshooting guides (TSG) for product supportability especially where new features are continuously pushed into the product. TSGs are generally made up of different actions items or commands that need to be run to gather data/logs and of actions/commands to take to resolve problems. Dependence on out-of-data TSGs results in challenging and expensive support processes as large number of tickets get escalated to engineering. Without an updated TSG, similar tickets continue to get escalated as lower-tier support has no information on how to solve these issues, resulting in wasted human and technology resources.

BRIEF DESCRIPTION OF THE DRAWINGS

Some embodiments are illustrated by way of example and not limitation in the figures of the accompanying drawings.

DETAILED DESCRIPTION

Figure 1:
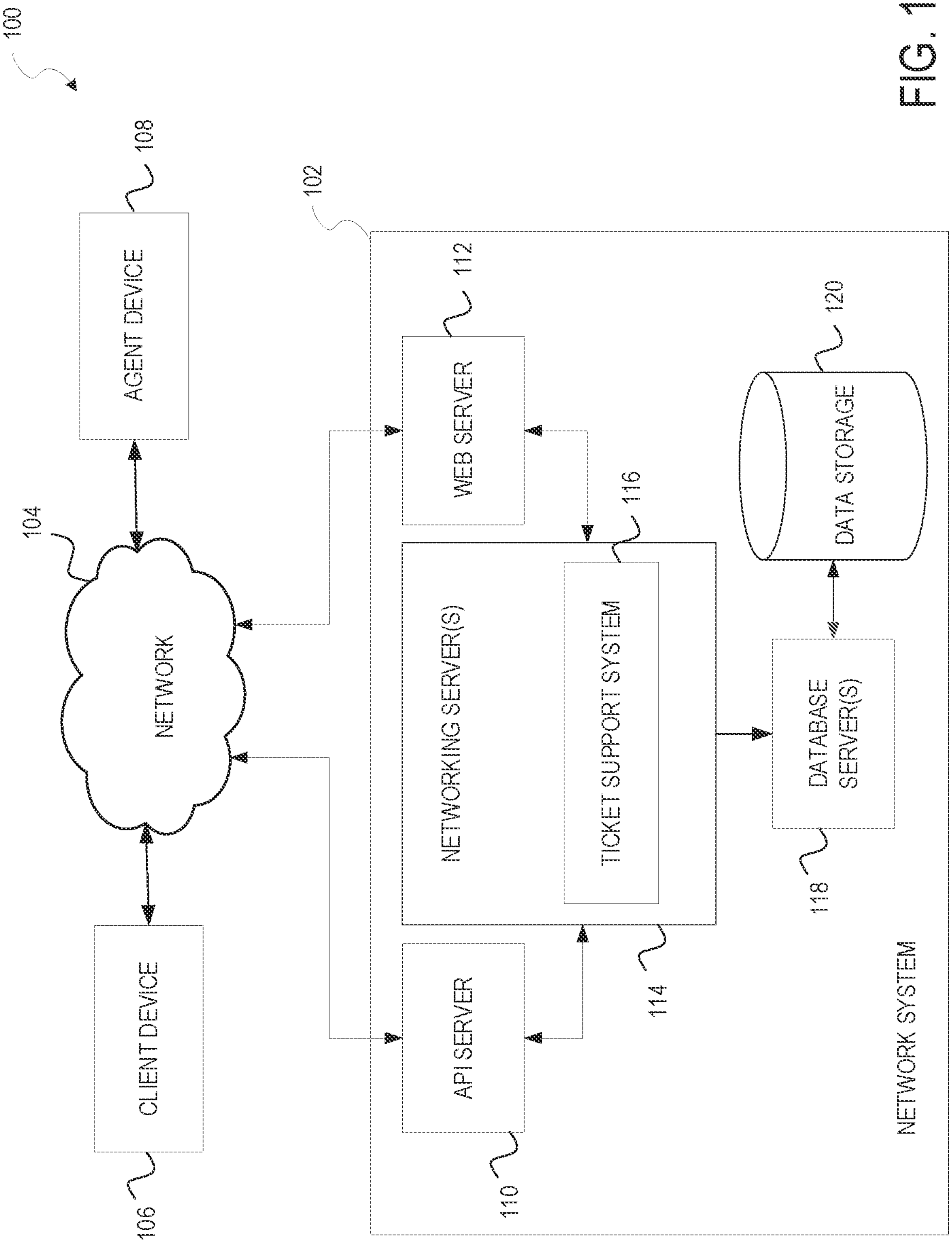
FIG. 1 is a diagram illustrating a network environment suitable for providing support in resolving a ticket using a machine learning model, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide systems and methods that machine-train (i.e., using machine-learning) a model and applies the (machine learning) model to a new support ticket to determine one or more common commands that resolves a problem identified in the new support ticket. The problem comprises an issue being experienced in a technical system (e.g., at a client device, at a server or platform providing services to the client device). The issue includes a technical issue experience by the technical system (e.g., software running incorrectly on a computing device, a component of a computing device not operating correctly). The machine training involves extracting commands used to resolve a plurality of prior support tickets. The commands comprise one or more actions performed with respect to the technical systems to resolve each issue experienced by the technical systems. The resolved support tickets are then clustered based on similarity of the extracted commands. For each cluster, the system then extracts problem statements from the resolved support tickets in the cluster. Problem statements indicate the technical issues being experience by (or associate with) a computing device. The machine learning model is then trained with training data comprising the extracted problem statements for each cluster. An output of the training includes a cluster number for each cluster that is used to represent a set of similar problem statements and one or more common commands.

During runtime, a problem statement is extracted from a new support ticket and the machine learning model is applied to the problem statement. Application of the machine learning model results in a predicted cluster number corresponding to (a cluster number of) a cluster that is predicted to resolve the problem associated with the new support ticket. One or more common commands used to resolve problems associated with the predicted cluster number are accessed and provided to the requesting user. In some cases, the one or more common commands are automatically applied to resolve the problem based on a match percentage between the problem statement of the new ticket and problem statements in the predicted cluster that transgresses a match percentage threshold. In other cases, the common commands are displayed to the requesting user (e.g., a support agent, client/customer).

Thus, example embodiments maintain and utilizes a machine-trained model that eliminates the need to use, maintain, and update TSGs. Because TSGs may not be updated frequently, the use of outdated TSGs, in conventional embodiments, results in increased bandwidth usage as support agents are forced to search (e.g., via their devices) for commands used to resolve newer problems. Additionally, if a solution cannot be easily identified from the TSGs, support agents escalate the problem to engineering, which increases usage of resources. Example embodiments address these disadvantages by using a machine learning model to identify a solution to a problem in a new support ticket that does not rely on TSG usage.

A same customer statement can map to more than one problem area and a problem area can manifest to a customer in different ways. Additionally, clients/customers can describe the same problem using different language or description. Because the clusters of the present system are generated based on similarity of commands used to resolve the support tickets and not on the problem statement, the present system can map different problem statements to the same cluster if the problem statements have the same resolution command(s). This makes the present system of finding similar support tickets and solutions much more robust, accurate, and efficient as it depends on the actual work done to resolve the problem and not on the customer problem statement.

Advantageously, example embodiments provide fast identification of a solution to resolve a technical problem identified for a new support ticket. Additionally, automatic application of the solution, when confidence is high (e.g., match percentage meets or exceeds a match percentage threshold), allows for immediate resolution of the technical problem. This, in the aggregate, reduces downtime of one or more applications, systems, or platforms and allows the application, system, or platform to quickly return to normal operating conditions. Accordingly, the present disclosure provides technical solutions that swiftly and accurately resolve a problem identified from a support ticket. The technical solution uses machine-learning to train a model that, at runtime, quickly identifies and, in some cases, causes automatic application of a solution (e.g., one or more commands) to resolve the problem.

FIG. 1 is a diagram illustrating a network environment 100 suitable for providing support in resolving a support ticket using a machine learning model, in accordance with example embodiments. A network system 102 provides server-side functionality via a communication network 104 (e.g., the Internet, wireless network, cellular network, or a Wide Area Network (WAN)) to one or more client devices 106. In example embodiments, the client device 106 is a device of a user (e.g., client or customer) that is experiencing a problem (e.g., with an application, system, or platform) associated with the network system 102. In some embodiments, the problem comprises a technical issue being experienced by the client device 106 or a technical issue affecting a component associated with the client device 106. For example, the client device 106 can be experiencing an issue that causes the client device 106 to not function correctly (e.g., software running incorrectly on the client device 106; a component of, or associated with, a client device 106 is not operating correctly). In example embodiments, the network system 102 trains a machine learning model using previously resolved tickets and their corresponding solutions (e.g., commands to resolve the problems) and, during runtime, applies the machine learning model to a new support ticket to identify one or more commands that will resolve a problem identified from the new support ticket, as will be discussed in more detail below.

One or more agent devices 108 are also communicative coupled to the network 104. The agent device 108 is a device of a support agent. In example embodiments, the support agent operating the agent device 108 functions as an intermediary that reviews a support ticket submitted from the client device 106 and obtains one or more commands, from the network system 102, to resolve a problem indicated in the support ticket. In an alternative embodiment, the agent device 108 is optional and the client device 106 accesses the network system 102 directly to obtain the one or more commands to resolve the problem.

The client device 106 and agent device 108 interfaces with the network system 102 via a connection with the network 104. Depending on the form of the client device 106 and agent device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide interoperability for Microwave Access (WiMAX) connection, or another type of wireless data connection. In such an embodiment, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 and agent device 108 may comprise, but is not limited to, a smartphone, tablet, laptop, multi-processor systems, microprocessor-based or programmable consumer electronics, game consoles, set-top boxes, a server, or any other communication device that can access the network system 102. In some embodiments, the client device 106 and agent device 108 each comprise a display module (not shown) to display information (e.g., in the form of user interfaces). The client device 106 and/or the agent device 108 can be operated by a human user or a machine user.

Turning specifically to the network system 102, an application programing interface (API) server 110 and a web server 112 are coupled to, and provide programmatic and web interfaces respectively to, one or more networking servers 114. The networking server(s) 114 host a ticket support system 116, which comprises a plurality of modules, and which can be embodied as hardware, software, firmware, or any combination thereof. The ticket support system 116 will be discussed in more detail in connection with FIG. 2.

The networking servers 114 are, in turn, coupled to one or more database servers 118 that facilitate access to one or more information storage repositories or data storage 120. In one embodiment, the data storage 120 is a storage device comprising a system access database storing resolved support tickets and related data for resolving the problems in the prior support tickets. The resolved support tickets each indicates a problem statement describing a previous issue or problem. The support tickets can be machine generated (e.g., automatically generated by the computing device upon detecting an issue) or human generated. The related data (e.g., metadata) includes one or more of a time that the resolved support ticket is received or logged by the network system 102, an identification of a support agent providing support on each support ticket, if one is involved in resolving the problem, and the one or more commands used to resolve the problem. The one or more commands comprise actions or instructions that were performed on a technical system (e.g., the client device 106, a server or platform associated with the client device 106) that fixed the technical issue experienced by, or associated with, the client device 106. The actions or instructions may cause a component of the technical system to perform an operation e.g., reboot/restart, wipe out a disk). In example embodiments, the commands are logged in a log of commands in the data storage 120 or other storage device. In alternative embodiments, the data storage 120 is located elsewhere in the network system 102 (e.g., at the networking server 114 or ticket support system 116).

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of client devices 106 and agent devices 108 may be embodied within the network environment 100. While only a single network system 102 is shown, alternative embodiments contemplate having more than one network system 102 to perform server operations discussed herein for the network system 102 (e.g., each localized to a particular region).

Figure 2:
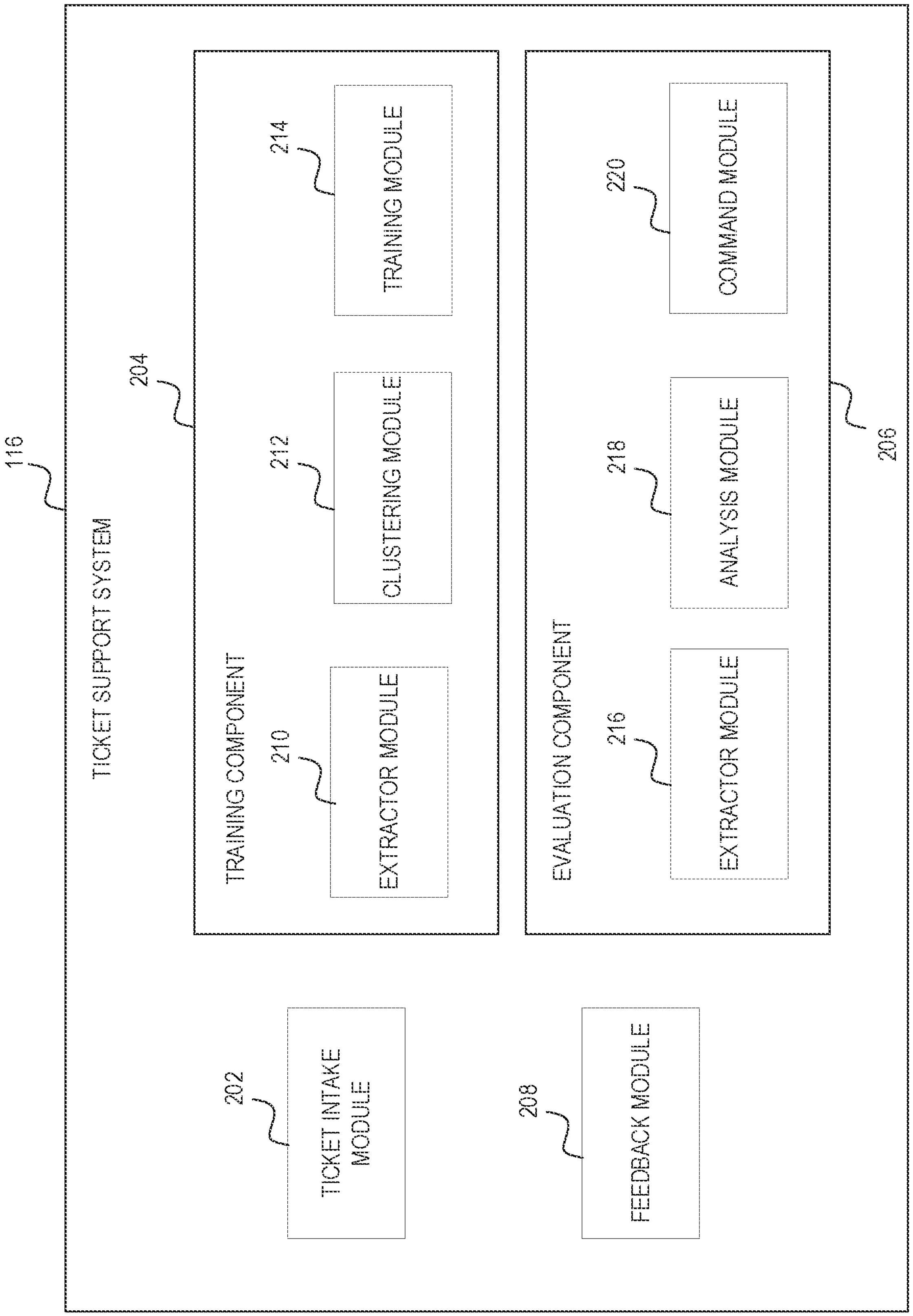
FIG. 2 is a block diagram illustrating components of a ticket support system, according to some example embodiments.

FIG. 2 is a block diagram illustrating components of the ticket support system 116, according to some example embodiments. The ticket support system 116 is configured to train a machine learning model, which during runtime, identifies a cluster of support tickets that includes a similar problem statement from which one or more commands are retrieved and used to resolve a new problem statement indicated in a new support ticket. To enable these operations, the ticket support system 116 includes a ticket intake module 202, a training component 204, an evaluation component 206, and a feedback module 208 all configured to communicate with each other (e.g., via a bus, shared memory, or a switch). While the embodiment of FIG. 2 shows the training component 204 and the evaluation component 206 being embodied within the ticket support system 116, alternative embodiments can comprise the training component 204 separate from the evaluation component 206 in different systems or servers.

The ticket intake module 202 is configured to receive new support tickets from various client devices (e.g., client device 106) and store the support tickets along with associated metadata in data storage (e.g., data storage 120). The metadata includes, for example, a time each support ticket was received, a tenant/client/customer associated with each support ticket, and a location of the support ticket origin.

In example embodiments, the training component 204 trains a machine learning model using training data obtained from a hatch of resolved support tickets and commands used to resolve the problems in the batch of prior support tickets. Accordingly, the training component 204 comprises an extractor module 210, a clustering module 212, and a training module 214.

The extractor module 210 is configured to identify cases where support tickets were successfully resolved and to access a log of commands used to resolve these cases from a system access database. The cases include support tickets that were escalated to engineering (e.g., support tickets that a support agent at the agent device 108 could not immediately or easily resolve). Additionally or alternatively, the cases can include support tickets resolved by the support personnel at the agent device 108 and/or tickets that were resolved in an automated manner (e.g., without the use of the support agent).

The extractor module 210 then extracts the commands from the log of commands. In embodiments where the log of commands cannot be accessed from the system access database, the extractor module 210 extracts commands from the ticket support system 116 as the ticket support system 116 also serves as a log for operations performed on each support ticket. Extraction from the ticket support system 116 is performed using Regex expression or artificial intelligence (AI) methods such as entity extraction. The extracted commands are correlated back to the support ticket using timing and/or the support agent.

The extracted commands are then passed to the clustering module 212, which clusters support tickets having similar commands together. For example, assume Ticket 1 used commands A, B, and C; Ticket 2 used commands A, B, and C; and Ticket 3 used command B. Here, the clustering module 212 clusters Ticket 1 and Ticket 2 into a first cluster, and Ticket 3 will be in a second cluster. Depending on clustering configuration/parameters, support tickets using similar, but not identical commands can be clustered together. For example, Ticket 4, which uses commands A, B, C, and D may be included in the first cluster. In one embodiment, the clustering module 212 uses K-mean clustering in which the support tickets are partitioned into a fixed number, k, of clusters. Thus, in the example above, k=2. One example embodiment of the present invention initially sets k=50. Over time and based on feedback, k can change as will be discussed further below. While K-means clustering is discussed, any unsupervised clustering technique such as Hierarchal/agglomerative will work.

Once the clusters are created, the extractor module 210 now extracts a problem statement (which can include or be a title) from each support ticket in a cluster. Although support tickets in the same cluster used the same or very similar commands to resolve respective problems, the problem statements can be very different. For instance, one problem statement may state "email cannot be sent," while a second problem statement states "not able to log in." By the description of these support tickets (e.g., the problem statement), the support tickets appear unrelated. However, the actions/commands taken to resolve these problems were the same or very similar (e.g., reboot the server). In cases, where the commands are very similar, there can be a difference of one or two commands. Because the clusters of the ticket support system 116 are generated based on the commands used to resolve the support tickets and not on the problem statement, the ticket support system 116 can map different problem statements to the same cluster if the problem statements have the same resolution command(s). This makes the ticket support system 116 much more robust, accurate, and efficient than conventional systems as it depends on the actual work done to resolve the problem and not on the customer problem statement.

The training module 214 trains a Natural Language Processing (NLP) model using, for example, neural networks or classical machine learning. The training data or input used for training includes the extracted problem statements from the resolved tickets that have been clustered together based on common commands and the output comprises a cluster number that represent each cluster and a vector of the extracted data. Every support ticket has a title or problem statement which is a natural language construct used to describe the problem. For each cluster, the training module 214 vectorizes the extracted data using all the natural language constructs in the cluster and counting the number of words in each natural language construct. For example, "outlook not working" is three words. The training module 214 trains on the problem statements and outputs a cluster number for each cluster.

In some embodiments, the training module 214, uses a combination of natural language features from each ticket and other ticket properties (e.g., tenant size, cloud location). One of the example techniques for extracting natural language features is TF-IDF (term frequency-inverse document frequency) technique but other NLP techniques such as neural networks—transformers, and so forth can be used. Once the NLP features are extracted, these features are combined with other ticket properties and sent to a classification model—neural or classical for training of these data to predict the cluster number.

During runtime, the evaluation component 206 of the ticket support system 204 is configured to identify a cluster with a highest percentage match to the problem statement of a new support ticket and retrieve one or more common commands from that cluster. To perform these operations, the evaluation component comprises an extractor module 216, an analysis module 206, and a command module 220. In example embodiments, the ticket intake module 202 receives the new support ticket and provides the new support ticket to the evaluation component 206. The extractor module 216 extracts the problem statement from the new support ticket. The problem statement of the new support ticket describes the issue that needs resolving. In some cases, the problem statement is a title of the new support ticket.

The problem statement is then passed to the analysis module 218, which applies the machine learning model to the problem statement and outputs a predicted cluster number. In example embodiments, the analysis module 218, using the machine learning model, matches the words and context and number of words in the created vectors to the words and number of words in the problem statement of the new support ticket. For instance, assume the problem statement of the new support ticket is "outlook unable to work." Here, two words ("outlook" and "work") match the cluster that contains the above example of "outlook not working" with approximately a 60% match. This comparative matching is performed on all the clusters and vectors representing the support tickets within each cluster to obtain match percentages. The analysis module 218 selects the cluster number of the cluster that provides the highest match percentage as the predicted cluster number. While percentage matching based on word/context matching is discussed herein, other methods for computing similarity can be used such as embedding-based distance or transformer-based distance methods.

The predicted cluster number is passed to the command module 220 which is configured to managing the provisioning of one or more common commands (e.g., one or more commands that is common to the cluster that was used to resolve the problems associated with that cluster) to the requesting user or device. As such, the command module accesses the one or more common command for the predicted cluster number. In one embodiment, the one or more common command from the cluster are displayed to the requesting user (e.g., a support agent). In this embodiment, one or more similar tickets can also be displayed to the requesting user. By providing the similar tickets, the requesting user can view similar tickets and the one or more commands before deciding to apply the one or more commands (e.g., for verification purposes). A confidence level (e.g., based on the percentage match) can also be displayed to the requesting user. Thus, this embodiment provides the requesting user guidance that cuts down on an amount of time needed to respond to a problem and reduces use of computing resources since the requesting user is not forced to access and search TSGs and/or escalate the problem to engineering when solutions cannot be easily identified.

In further embodiment, the command module 220 determines whether to automatically apply the one or more commands. The determination is based on whether the percentage match transgresses (e.g., meets or exceeds) a percentage match threshold associated with the component, application, or system that is connected with the problem and/or the type of command that will be applied. In some embodiments, a command that relates to a client-side operation (e.g., performed on the client device 106) may have a lower percentage match threshold than a command that relates to a server-side or data center operation (e.g., affects a server, data center, platform). Additionally, a command that performs a less critical or non-permanent operation may have a lower percentage match threshold. For example, if the command is to reboot a server in data center, a confidence level or percentage match threshold will be lower that a command to wipeout of a hard disk. The percentage match threshold can be set by operators of each application, system, or platform and can differ for different application, systems, and platforms. For instance, Microsoft Outlook can have different percentage match thresholds than Microsoft SharePoint or Microsoft Exchange, and within each application, system, service, or platform, different percentage match thresholds can be established for different commands (e.g., higher for wipeout of disk; lower for a reboot of a server or restart of an application).

Automatic application of the solution, when confidence is high (e.g., match percentage meets or exceeds a match percentage threshold), allows for immediate resolution of the problem. This reduces downtime of one or more applications, systems, or platforms and allows the application, system, or platform to quickly return to normal operating conditions.

In embodiments where more than one cluster matches or have a close match score (e.g., within 5%), a list of the cluster commands for each matching cluster can be displayed to the requesting user. Examples of the support tickets can also be displayed. The requesting user then decides which one or more commands (e.g., based on similar tickets) to apply. Alternatively, if more than one cluster matches, the ticket support system 116 can default to conventional means of using a TSG or escalating to engineering. The process used when more than one cluster matches can also depend on the application, system, service, or platform.

The feedback module 208 is configured to manage feedback associated with resolution of the problem. In some cases, the requesting user (e.g., support agent) can provide a rating (e.g., thumbs up or down; star ratting) for the one or more commands that were provided to resolve the problem. For resolved support tickets, the feedback module 208 also stores the agent/support personnel involved in resolving each support ticket and logs the one or more commands used to resolve the problem in the log of commands, thus correlating the commands back to a corresponding support ticket based on the time and the support agent. In embodiments where the one or more commands are automatically applied, the one or more commands can be logged along with whether the problem was resolved.

Periodically, the feedback is used to update the training component 204. One update is tuning the clustering algorithm. In one embodiment, the tuning is triggered based on a high amount of negative feedback. For instance, the number of clusters can be changed (e.g., increase the number of clusters because the training component 204 is mapping together tickets that should not be), a cluster size can be changed, or certain commands may be ignored. Additionally, the NPL algorithm can be adjusted. Thus, the feedback is used to retrain the machine learning model. In cases where the feedback is a high amount of positive feedback, there may be a higher chance of automating the application of the command(s) (e.g., lower a percentage match threshold for that command and cluster combination). For instance, if one or more commands appear to always resolve a particular type of problem, then the percentage match threshold may be lowered for that one or more command for the particular type of problem.

While example embodiments were discussed that cluster on the command(s) used to resolve the problems, a further embodiment uses one or more additional attributes/signals (exclusive of the problem statement) to enhance the clustering and thus, the training (e.g., provide better accuracy using the model). The additional attribute/signal to cluster on includes one or more of, for example, (1) telemetry from the service or system, (2) time period associated with the support ticket, (3) how a client/customer is using the service or system, (4) a state of the network, (5) a number of users for the client/customer, and/or (6) the client/customer themselves.

Additionally, the additional attributes/signals can be used to verify the one or more commands that are retrieved. The verification can, in one embodiment, allow the one or more commands to be automatically applied and/or boost the confidence level/thatch percentage. For example, if the user is Company A and they experience the same problem at the same time of day or time of year, the typical command is to reboot the server. In this case, the ticket support system 116 will provide the same command (e.g., reboot the service) with a high confidence level and/or automatically perform the reboot.

Figure 3:
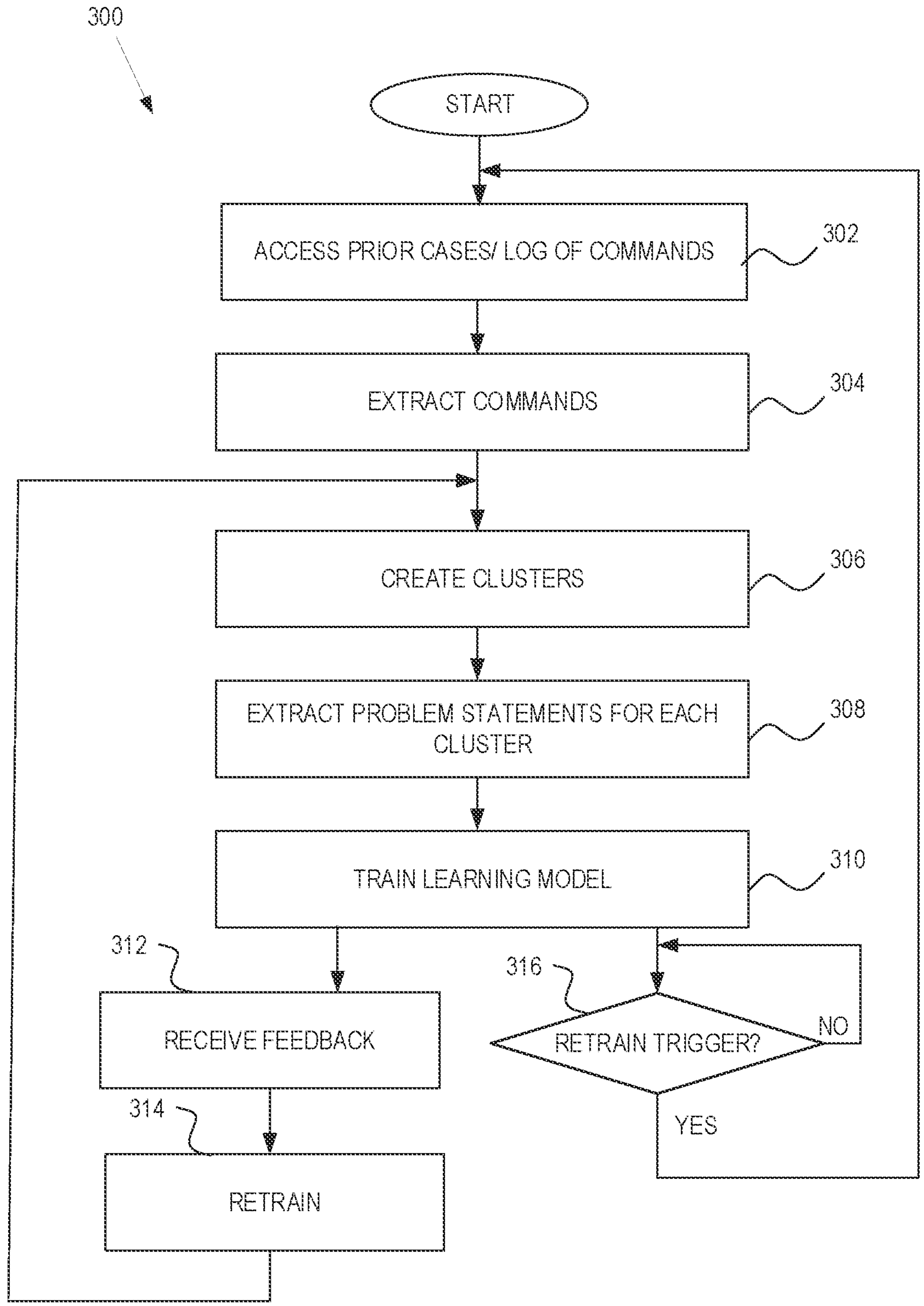
FIG. 3 is a flowchart illustrating operations of a method for training the machine learning model of the ticket support system, according to some example embodiments.

FIG. 3 is a flowchart illustrating operations of a method 300 for training a machine learning model of the ticket support system 116, according to some example embodiments. Operations in the method 300 may be performed by the ticket support system 116 of the network system 102, using components described above with respect to FIG. 2. Accordingly, the method 300 is described by way of example with reference to the ticket support system 116. However, it shall be appreciated that at least some of the operations of the method 300 may be deployed on various other hardware configurations or be performed by similar components residing elsewhere in the ticket support system 116. Therefore, the method 300 is not intended to be limited to the ticket support system 116.

In operation 302, the extractor module 210 identifies and accesses cases where support tickets were successfully resolved and a log of commands that were used to resolve the issues from these cases. In one embodiment, the log of commands is accessed from a system access database. The cases include tickets that were escalated to engineering (e.g., tickets that a support agent at the agent device 108 could not immediately or easily resolve).

In operation 304, the extractor module 210 extracts the commands from the log of commands. The log of commands indicates the commands used to resolve each of the problems in the identified cases. In embodiments where the log of commands cannot be accessed from the system access database or as an alternative embodiment, the extractor module 210 extracts commands from the ticket support system 116 since the ticket support system 116 also logs operations performed on each support ticket. Extraction from the ticket support system 116 is performed using, for example. Regex expression or artificial intelligence (AI) methods such as entity extraction. The extracted commands are correlated back to the support ticket using timing and/or the support agent although other attributes can also be used.

In operation 306, the clustering module 212 creates clusters of support tickets having the same or similar commands. In one embodiment, the clustering module 212 uses K-mean clustering in which the support tickets are partitioned into a fixed number, k, of clusters. Here, k is configurable and is adjustable based on feedback. While K-means clustering is discussed, any unsupervised clustering technique such as Hierarchal/agglomerative can be used.

In operation 308, the extractor module 210 extracts problem statements for each support ticket in each cluster. In some cases, the problem statement is also the title of a support ticket.

In operation 310, the training module 214 trains the machine learning model. In example embodiments, the machine learning model is a Natural Language Processing (NLP) model. The training is performed using neural networks or classical machine learning. The training data or input used for training includes the extracted problem statements from the resolved tickets for each cluster and the output for each cluster comprises a cluster number that represents each cluster and a vector that represents the extracted data. Every support ticket has a title or problem statement which is a natural language construct to describe the problem. For each cluster, the training module 214 vectorizes the extracted data using all the natural language constructs in the cluster and counting the number of words in each natural language construct. The training module 214 trains on the problem statements and outputs a cluster number for each cluster. The machine learning model is then maintained (e.g., stored, periodically updated) for use during runtime.

In operation 312, the feedback module 208 receives feedback associated with resolution of the problems. The feedback is received from one or more of an support agent that assists a customer/client in resolving the problem or from the customer/client, themselves. The feedback includes a rating from the support agent or customer/client, whereby the rating can include a positive (e.g., thumbs up) or negative (e.g., thumbs down) rating or a numerical rating (e.g., rating from 1 to 5). The feedback can also indicate whether automatically applied command(s) resolve the problem.

In operation 314, the feedback is used to retrain the machine learning model. In one embodiment, the feedback is used to tune the clustering algorithm. The tuning comprises one or more of changing a number of clusters (e.g., increase or decrease the number of clusters), changing a size of the clusters, or ignoring certain commands. In some cases, the feedback can also be used to change a percentage match threshold. For instance, if one or more commands appears to always resolve a particular type of problem, then the percentage match threshold may be lowered for that one or more command for that particular type of problem.

In operation 316, a determination is made whether a retrain trigger is detected. In one embodiment, the machine learning model is retrained periodically. Thus, the retrain trigger comprises a predetermined time period. In another embodiment, the retraining of the machine learning model is triggered when a threshold number of new cases have been resolved. In this embodiment, the new cases embody a new batch of tickets that is used for training the machine learning model. Alternatively, the new cases are added to a portion of the resolved cases. For example, the new cases can comprise tickets from a last particular time period (e.g., last 2 months). If a retrain trigger is detected, the method 300 returns to operation 302 where the update cases and updated log of commands are accessed. If the retrain trigger is not detected, then the method 300 periodically checks for the retrain trigger.

Figure 4:
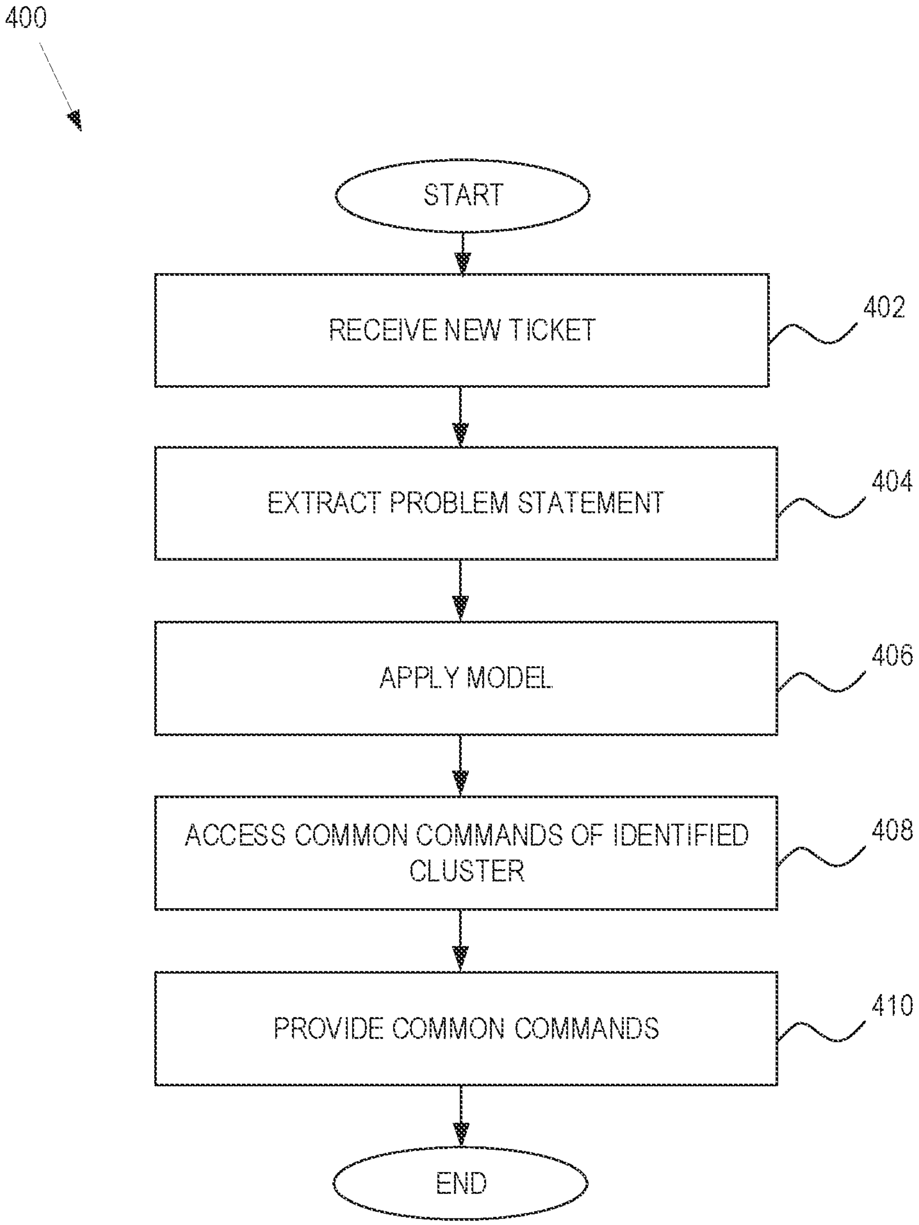
FIG. 4 is a flowchart illustrating operations of a method for providing ticket support using the machine learning model, according to some example embodiments.

FIG. 4 is a flowchart illustrating operations of a method 400 for providing ticket support using the machine learning model during runtime, according to some example embodiments. Operations in the method 400 may be performed by the ticket support system 116 of the network system 102, using components described above with respect to FIG. 2. Accordingly, the method 400 is described by way of example with reference to the ticket support system 116. However, it shall be appreciated that at least some of the operations of the method 400 may be deployed on various other hardware configurations or be performed by similar components residing elsewhere in the network environment 100. Therefore, the method 400 is not intended to be limited to the ticket support system 116.

In operation 402, the ticket intake module 202 receives a new support ticket indicating a problem that is currently being experienced by a customer or client. The ticket intake module 202 then provides the new support ticket to the evaluation component 206.

In operation 404, the extractor module 216 of the evaluation component 206 extracts a problem statement that indicates the problem from the new support ticket. In some cases, the problem statement is a title of the new support ticket.

In operation 406, the analysis module 218 applies the machine learning model to the problem statement extracted from the new support ticket to output a predicted cluster number. In example embodiments, the analysis module 218, using the machine learning model, matches the words and number of words in the created vectors to the words and number of words in the problem statement of the new support ticket. The comparative matching is performed on all the clusters and vectors representing the support tickets within the cluster to obtain match percentages. The analysis module 218 selects the cluster number of the cluster that provides the highest match percentage as the predicted cluster number.

In operation 408, the command module 220 accesses the common command(s) of the cluster corresponding to the identified cluster number from operation 406. The command module 220 then provides the one or more common commands in operation 410. In one embodiment, the one or more commands are simply provided to (e.g., caused to be displayed to) a requesting user such as an support agent or a client/customer. In this embodiment, one or more similar tickets and/or a confidence level (e.g., based on the percentage match) can be displayed to the requesting user. Thus, this embodiment provides the requesting user guidance that cuts down on an amount of time needed to respond to a problem and reduces use of computing resources since the requesting user is not forced to access and search TSGs and/or escalate the problem to engineering when solutions cannot be easily identified.

In a further embodiment, the command module 220 determines whether to automatically apply the one or more commands. This embodiment is discussed in more detail in connection with FIG. 5 below.

Figure 5:
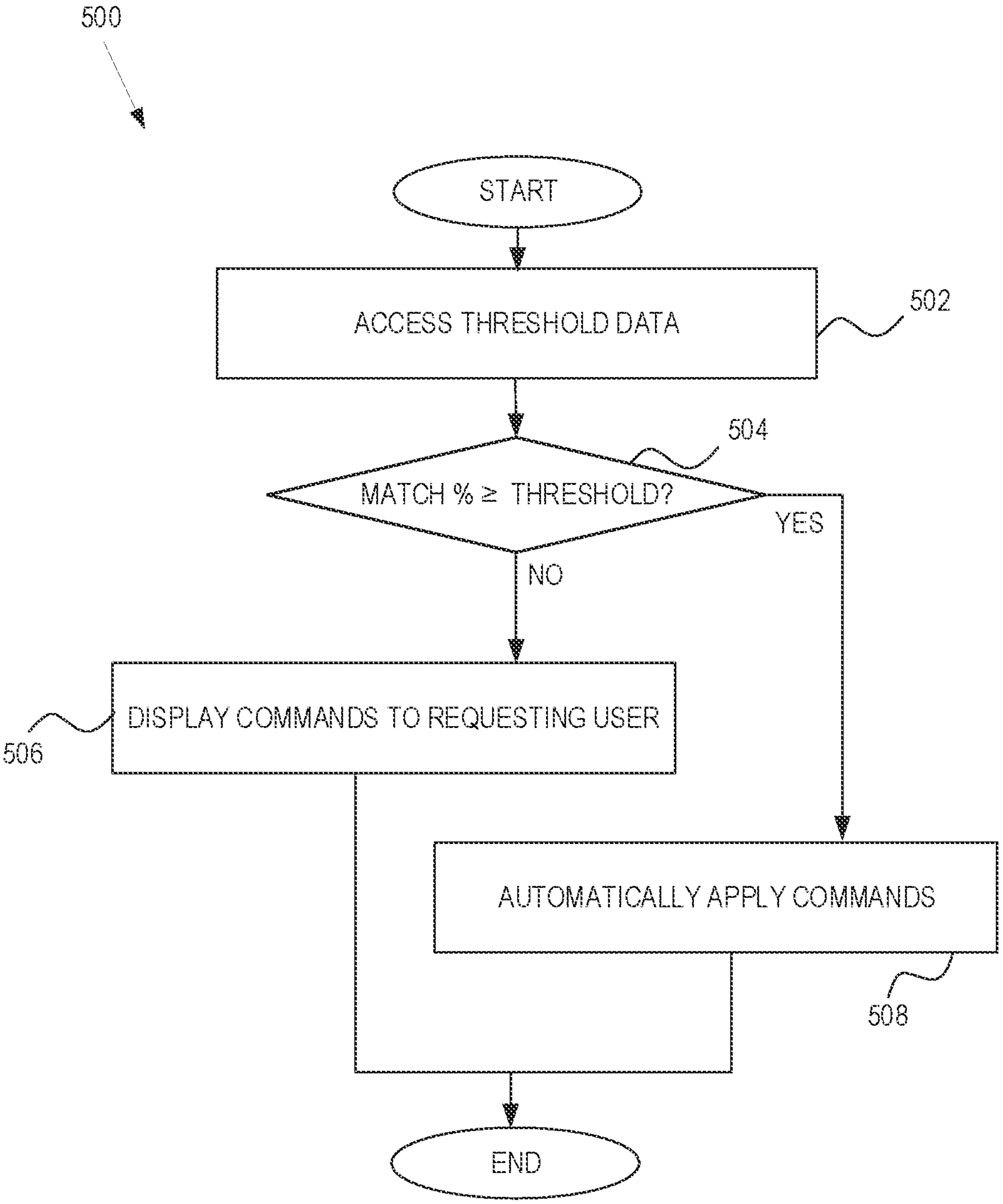
FIG. 5 is a flowchart illustrating operations of a method for providing commands based on the machine learning model, according to some example embodiments.

FIG. 5 is a flowchart illustrating operations of a method 500 for providing commands based on the machine learning model, according to some example embodiments. Operations in the method 500 may be performed by the ticket support system 116, using components described above with respect to FIG. 2. Accordingly, the method 500 is described by way of example with reference to the ticket support system 116. However, it shall be appreciated that at least some of the operations of the method 500 may be deployed on various other hardware configurations or be performed by similar components residing elsewhere in the network environment 100. Therefore, the method 500 is not intended to be limited to the ticket support system 116.

In operation 502, the command module 220 accesses match percentage threshold data for the application, system, or platform that is associated with the problem and/or the type of command that will be applied. The match percentage threshold is stored in a data storage (e.g., data storage 120). The percentage match threshold can be set by operators of each application, system, or platform or can be machine learned. For instance, the percentage match threshold can be initially set to a default value and adjusted based on feedback from users (e.g., support agent, clients, customers) using machine learning.

In operation 504, a determination is made whether the match percentage determined in operation 406 meets or exceeds the match percentage threshold. If the match percentage does not meet or exceed the match percentage threshold, then the commands are displayed to the requesting user in operation 506. In this embodiment, one or more similar tickets and/or a confidence level (e.g., based on the percentage match) can be displayed to the requesting user.

However, if the match percentage meets or exceeds the match percentage threshold, the command module 220 automatically applies the one or more commands in operation 508. Automatic application of the one or more commands, when confidence is high (e.g., match percentage meets or exceeds a match percentage threshold), allows for immediate resolution of the problem, which reduces downtime of an application, system, or platform affected by the problem and allows the application, system, or platform to quickly return to normal operating conditions.

Figure 6:
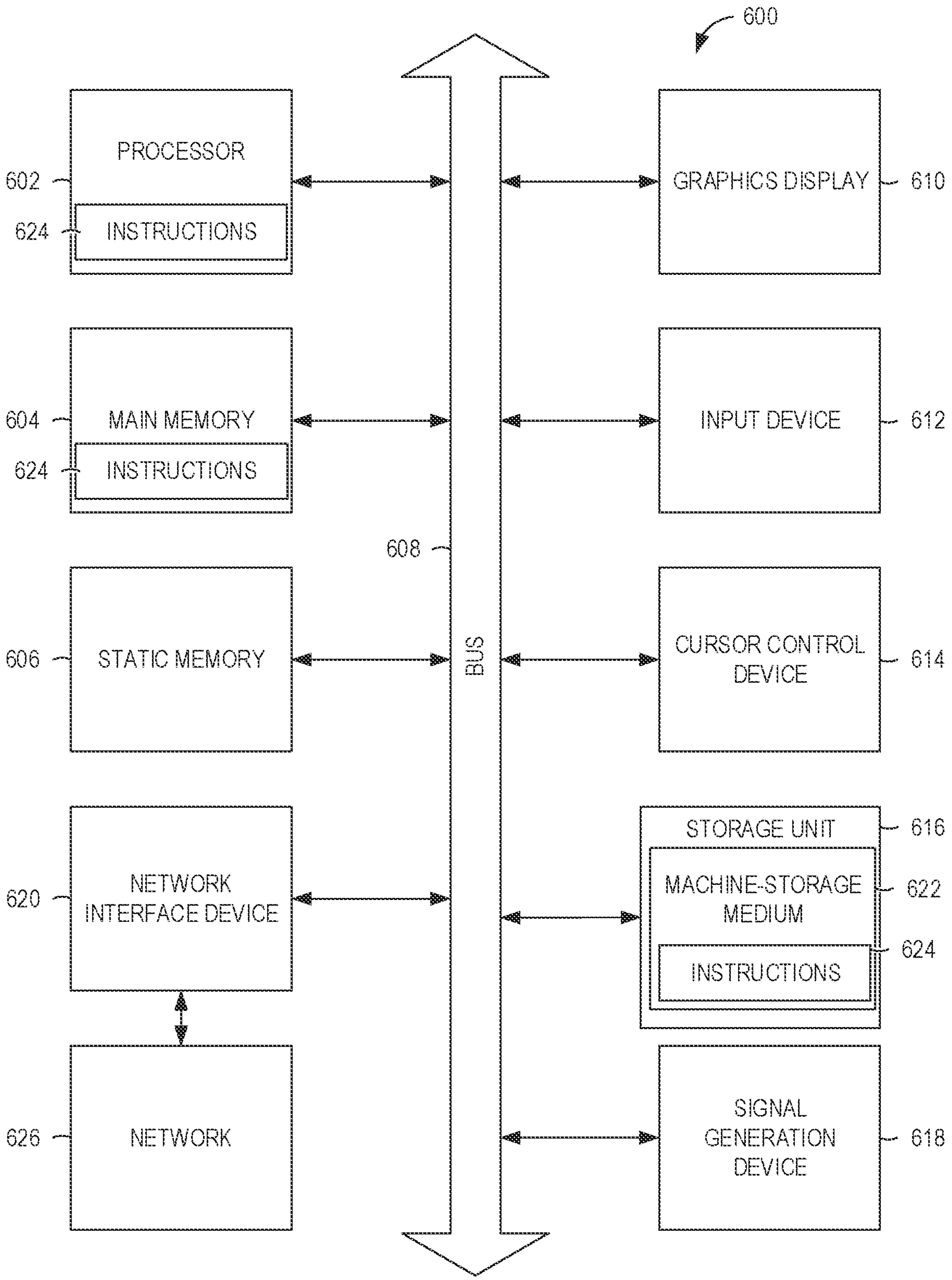
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the block and flow diagrams of FIGS. 3 to 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (MC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions Aid Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing ticket support based on a machine learning model trained using clusters of support tickets that are clustered based on similarity of resolution commands. The method comprises extracting, by a network system, commands used to resolve technical problems indicated in a plurality of resolved support tickets; creating, by one or more hardware processors of the network system, clusters of resolved support tickets based on similarity of the commands extracted from the plurality of resolved support tickets; for each cluster of the resolved support tickets, extracting, by the network system, problem statements from the resolved support tickets in the same cluster, the problem statements each indicating the technical problem; training, by the network system, a machine learning model with training data comprising the extracted problem statements from the same cluster to identify a cluster number for each cluster and a vector representing the extracted problem statements for each cluster; and maintaining the machine learning model for use during runtime.

In example 2, the subject matter of example 1 can optionally include, during runtime, in response to receiving a new support ticket, extracting, by the network system, a problem statement from the new support ticket; identifying, by one or more hardware processors of the network system, a predicted cluster number by applying the trained machine learning model to the extracted problem statement from the new support ticket; based on the predicted cluster number, accessing one or more common commands used to resolve the resolved support tickets in the cluster corresponding to the predicted cluster number; and providing the one or more common commands to a requesting user.

In example 3, the subject matter of any of examples 1-2 can optionally include wherein the providing the one or more common commands comprises automatically applying the one or more common commands.

In example 4, the subject matter of any of examples 1-3 can optionally include wherein the identifying the predicted cluster number comprises determining match percentages between the extracted problem statement from the new support ticket and natural language constructs representing the extracted problem statements from the support tickets in each cluster.

In example 5, the subject matter of any of examples 1-4 can optionally include wherein the identifying the predicted cluster number comprises selecting the cluster having a highest match percentage.

In example 6, the subject matter of any of examples 1-5 can optionally include wherein the providing the one or more common commands comprises automatically applying the one or more common commands based on the highest match percentage transgressing a match percentage threshold.

In example 7, the subject matter of any of examples 1-6 can optionally include wherein the providing the one or more common commands comprises causing display of the one or more common commands along with a confidence level on a device of the requesting user, the confidence level corresponding to a match percentage Obtained from applying the trained machine learning model to the extracted problem statement from the new support ticket.

In example 8, the subject matter of any of examples 1-7 can optionally include wherein the providing the one or more common commands comprises causing display of the one or more common commands along with one or more support tickets from the cluster corresponding to the predicted cluster number on a device of the requesting user.

In example 9, the subject matter of any of examples 1-8 can optionally include receiving feedback on the one or more common commands that were provided; and using the feedback to tune the creating of the clusters, wherein the using the feedback to tune the creating of the clusters comprises one or more of changing a number of clusters, ignoring certain commands, or changing a cluster size.

In example 10, the subject matter of any of examples 1-9 can optionally include receiving feedback on the one or more common commands that were provided; and based on the feedback, changing a match percentage threshold that determines whether to automatically apply the one or more commands.

In example 11, the subject matter of any of examples 1-10 can optionally include wherein the training the machine learning model comprises training a natural language model.

In example 12, the subject matter of any of examples 1-11 can optionally include wherein the creating the clusters of the resolved support tickets further comprises clustering based on a combination of the similarity of commands and a second signal that excludes the problem statements.

Example 13 is a system comprising means for carrying out the method of any of examples 1-12.

Example 14 is a machine-readable medium comprising instructions which, when executed by a machine, cause the machine to carry out the method of any of examples 1-12.

Example 15 is a method for providing ticket support based on a machine learning model trained using clusters of support tickets that are clustered based on similarity of resolution commands. The method comprises, in response to receiving a new support ticket, extracting, by a network system, a problem statement from the new support ticket; identifying, by one or more hardware processors of the network system, a predicted cluster number by applying a trained machine learning model to the extracted problem statement from the new support ticket, the trained machine learning model being trained on clusters of resolved support tickets that have been clustered together based on commands used to resolve the resolved support tickets; based on the predicted cluster number, accessing one or more common commands used to resolve the resolved support tickets in the cluster corresponding to the predicted cluster number; and providing the one or more common commands to a requesting user.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:

extracting, by a network system, commands used to resolve technical problems indicated in a plurality of resolved support tickets, a technical problem comprising an issue experienced in a technical system, each of the commands comprising at least one instruction that causes the network system to perform one or more operations;

creating, by one or more hardware processors of the network system, clusters of resolved support tickets based on similarity of the at least one instruction associated with each of the commands used to resolve technical problems that have been extracted from the plurality of resolved support tickets and not based on problem statements in the resolved support tickets, the problem statements each indicating the technical problem, the clusters further based on a number of words in the at least one instruction associated with each of the commands;

for each cluster of the resolved support tickets, extracting, by the network system, the problem statements from the resolved support tickets in the same cluster;

training, by the network system, a machine learning model with training data comprising the extracted problem statements from the resolved tickets that have been clustered together based on common commands, each of the common commands comprising at least one common instruction that causes the network system to perform one or more common operations, a cluster number for each cluster and a vector representing the extracted problem statements for each cluster;

maintaining the machine learning model for use during runtime to resolve technical problems by applying the machine learning model to a problem statement extracted from a new support ticket;

applying the common commands that correspond to the technical problems based on clusters identified by the machine learning model;

identifying feedback indicative of whether the common commands successfully resolved the technical problem; and based on the feedback, automatically retraining the machine learning model by changing a number of the clusters.

2. The computer-implemented method of claim 1 further comprising, during runtime:

in response to receiving the new support ticket, extracting, by the network system, a problem statement from the new support ticket;

identifying, by one or more hardware processors of the network system, a predicted cluster number by applying the trained machine learning model to the extracted problem statement from the new support ticket;

based on the predicted cluster number, accessing one or more common commands used to resolve the resolved support tickets in the cluster corresponding to the predicted cluster number; and providing the one or more common commands to a requesting user, the commands comprising one or more actions to be performed with respect to the technical system to resolve the issue.

3. The computer-implemented method of claim 2, wherein the providing the one or more common commands comprises automatically performing the one or more actions.

4. The computer-implemented method of claim 2, wherein the identifying the predicted cluster number comprises determining match percentages between the extracted problem statement from the new support ticket and natural language constructs representing the extracted problem statements from the support tickets in each cluster.

5. The computer-implemented method of claim 2, wherein the identifying the predicted cluster number comprises selecting the cluster having a highest match percentage.

6. The computer-implemented method of claim 5, wherein the providing the one or more common commands comprises automatically performing the one or more actions based on the highest match percentage transgressing a match percentage threshold.

7. The computer-implemented method of claim 2, wherein the providing the one or more common commands comprises causing display of the one or more common commands along with a confidence level on a device of the requesting user, the confidence level corresponding to a match percentage obtained from applying the trained machine learning model to the extracted problem statement from the new support ticket.

8. The computer-implemented method of claim 2, wherein the providing the one or more common commands comprises causing display of the one or more common commands along with one or more support tickets from the cluster corresponding to the predicted cluster number on a device of the requesting user.

9. The computer-implemented method of claim 2, further comprising:

receiving feedback on the one or more common commands that were provided; and using the feedback to tune the creating of the clusters, wherein the using the feedback to tune the creating of the clusters comprises one or more of changing a number of clusters, ignoring certain commands, or changing a cluster size.

10. The computer-implemented method of claim 2, further comprising:

receiving feedback on the one or more common commands that were provided; and based on the feedback, changing a match percentage threshold that determines whether to automatically apply the one or more commands.

11. The computer-implemented method of claim 1, wherein the training the machine learning model comprises training a natural language model.

12. The computer-implemented method of claim 1, wherein the creating the clusters of the resolved support tickets further comprises clustering based on a combination of the similarity of commands and a second signal that excludes the problem statements.

13. A system comprising means for carrying out the method of claim 1.

14. A non-transitory computer-readable medium comprising instructions which, when executed by a machine, cause the machine to carry out the method of claim 1.

15. A computer-implemented method comprising:

in response to receiving a new support ticket, extracting, by a network system, a problem statement from the new support ticket, the problem statement indicating a technical problem comprising an issue experienced in a technical system;

identifying, by one or more hardware processors of the network system, a predicted cluster number by applying a trained machine learning model to the extracted problem statement from the new support ticket, the trained machine learning model being trained on clusters of resolved support tickets that have been clustered together based on commands used to resolve the resolved support tickets, each of the commands comprising at least one instruction that causes the network system to perform one or more operations, the cluster number further based on a number of words in the commands used to resolve the resolved support tickets;

based on the predicted cluster number, accessing one or more common commands used to resolve the resolved support tickets in the cluster corresponding to the predicted cluster number, each of the one or more common commands comprising at least one common instruction that causes the network system to perform one or more common operations;

providing the one or more common commands to a requesting user, the commands comprising one or more actions to be performed with respect to the technical system to resolve the issue;

applying the common commands that correspond to the technical problems based on clusters identified by the machine learning model;

identifying feedback indicative of whether the common commands successfully resolved the technical problem; and based on the feedback, automatically retraining the machine learning model by modifying cluster sizes.

16. A system comprising:

at least one processor; and at least one memory component storing instructions that, when executed by the at least one processor, cause the at least one processor to perform operations comprising:

extracting, by a network system, commands used to resolve technical problems indicated in a plurality of resolved support tickets, a technical problem comprising an issue experienced in a technical system, each of the commands comprising at least one instruction that causes the network system to perform one or more operations;

creating, by one or more hardware processors of the network system, clusters of resolved support tickets based on similarity of the at least one instruction associated with each of the commands used to resolve technical problems that have been extracted from the plurality of resolved support tickets and not based on problem statements in the resolved support tickets, the problem statements each indicating the technical problem, the clusters further based on a number of words in the at least one instruction associated with each of the commands;

for each cluster of the resolved support tickets, extracting, by the network system, the problem statements from the resolved support tickets in the same cluster;

training, by the network system, a machine learning model with training data comprising the extracted problem statements from the resolved tickets that have been clustered together based on common commands, each of the common commands comprising at least one common instruction that causes the network system to perform one or more common operations, a cluster number for each cluster and a vector representing the extracted problem statements for each cluster;

maintaining the machine learning model for use during runtime to resolve technical problems by applying the machine learning model to a problem statement extracted from a new support ticket;

applying the common commands that correspond to the technical problems based on clusters identified by the machine learning model;

identifying feedback indicative of whether the common commands successfully resolved the technical problem; and based on the feedback, automatically retraining the machine learning model by adjusting the match percentage threshold.

17. The method of claim 1, wherein the creating the clusters comprises clustering based on a combination of a similarity of the at least one instruction and additional technical attributes comprising at least one of: telemetry data from the technical system.

* * * * *